No. 882,080. PATENTED MAR. 17, 1908.
G. E. SAVAGE.
PERCOLATOR POT CONSTRUCTION.
APPLICATION FILED FEB. 19, 1907.
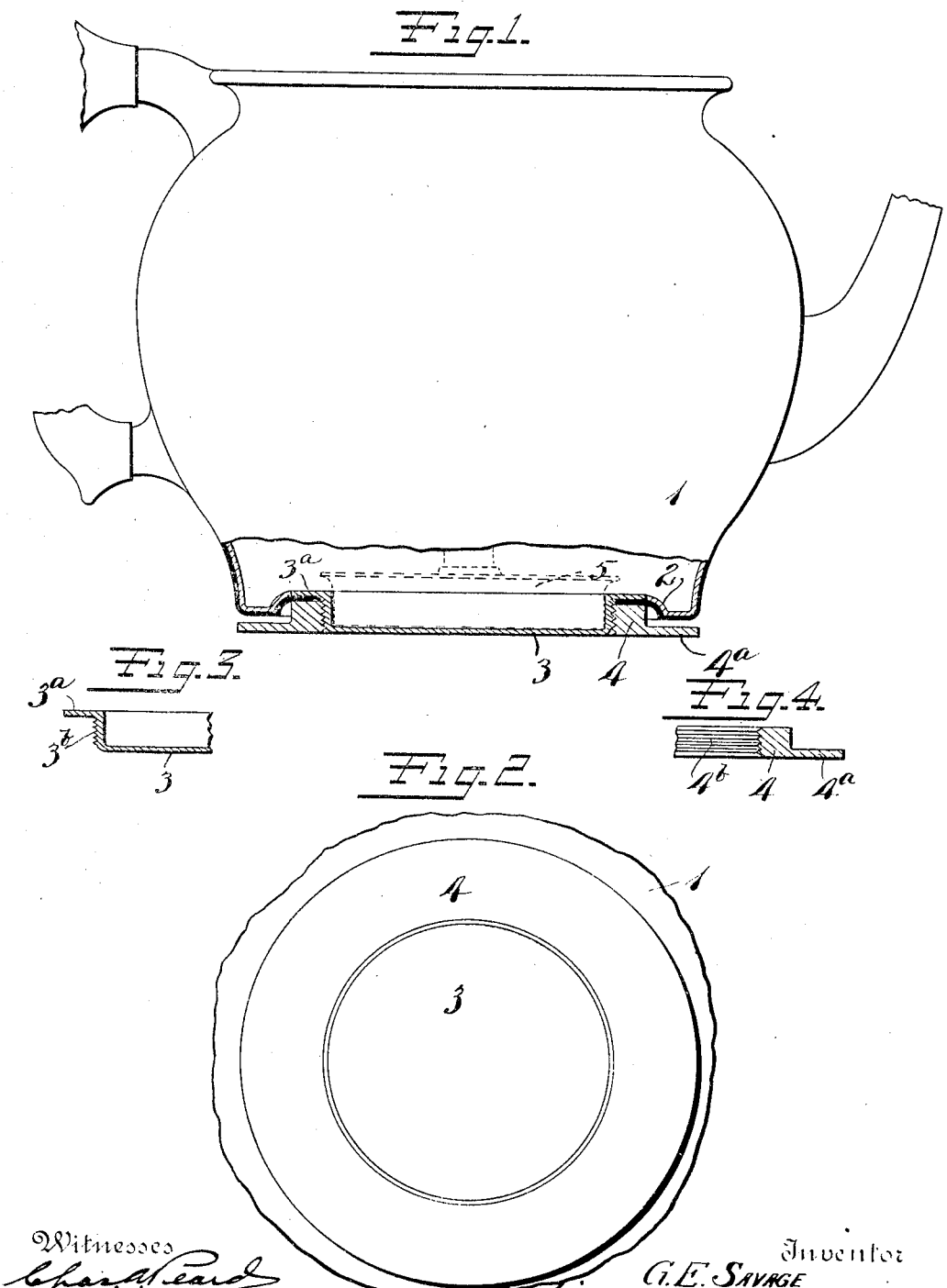

UNITED STATES PATENT OFFICE.

GEORGE E. SAVAGE, OF MERIDEN, CONNECTICUT, ASSIGNOR TO MANNING, BOWMAN & COMPANY, OF MERIDEN, CONNECTICUT, A CORPORATION OF CONNECTICUT.

PERCOLATOR-POT CONSTRUCTION.

No. 882,080.  Specification of Letters Patent.  Patented March 17, 1908.

Application filed February 19, 1907. Serial No. 358,193.

*To all whom it may concern:*

Be it known that I, GEORGE E. SAVAGE, a citizen of the United States, residing at Meriden, county of New Haven, State of Connecticut, have invented certain new and useful Improvements in Percolator-Pot Construction, of which the following is a full, clear, and exact description.

My invention relates to improvements in percolators, so called.

The invention is particularly applicable and valuable in connection with percolators in which the pot is provided with a porcelain interior lining.

Another object is to provide an overflow for the excess of liquid that is pumped up when the percolator is overheated.

In the accompanying drawings: Figure 1 is a side elevation of a percolator pot, the lower part being in section, a portion of the handle and spout being broken off. Fig. 2 is a view of the underside. Fig. 3 is a sectional view of a detached detail partly broken away. Fig. 4 is a sectional view of another detail detached and partly broken away.

1 represents the body of the pot which may be of any suitable design. 2 represents an interior lining of any suitable porcelain material which may be applied to said pot.

3 is the bottom of the heating chamber. This bottom portion is disk like in form, and is provided with screw threads 3$^b$ on the exterior side of an annular vertical wall formed integrally with the bottom 3. The upper edge of this annular screw threaded wall has an outwardly projecting flange 3$^a$.

4 is a clamping ring and base extension, the same being screw threaded at 4$^b$ in its inner wall in a manner to adapt it to the screw threads 3$^b$.

4$^a$ is an outwardly directed flange at the bottom of the base ring 4 to give stability to the pot, as well as to furnish material for the ready absorption of heat to be transmitted to the heating chamber.

This invention, so far as the formation of the perforated receptacle for holding the coffee grounds or other ground material from which the beverage is to be drawn, the cover therefor the heating chamber and outlet therefrom may be concerned, is the same in manner as shown in patents formerly granted to me, for example, Patent No. 821124, of May 22, 1906. The heating chamber is formed between the bottom 3 and the crown of a bell like member which is adapted to be detachably fitted into the space directly above the bottom 3. This bell like member is illustrated in dotted lines in Fig. 1, and denoted by the reference numeral 5. The form of and construction of the bell like member, of course, is immaterial to this invention. It will be observed that the area of the heating chamber, to wit, that space between the vertical side walls of the bottom 3, is of quite small area as compared with the full area of the bottom part of the percolator pot, with the result that it contains only a relatively small quantity of liquid so that the heat of the stove will quickly raise the temperature to the boiling point, and start the percolator action after the manner set forth in my above referred to patent.

Many difficulties are encountered in the formation of the heating chamber, particularly in pots which are porcelain lined. This invention is designed to improve this feature of construction. It will be observed that the bottom of the pot 1 has an opening therein sufficient to permit the bottom 3 to be passed through from the inside. The flange 3$^a$ rests on the pot around said perforation. The parts are assembled as shown in Fig. 1, the member 4 being screwed tightly into place so as to rigidly clamp the edge of the pot entirely around the opening through which the bottom 3 passes. The porcelain 2 may cover the interior of the pot, save where the flange 3$^a$ rests upon the same. The flange 4$^a$ is spaced away from the body 1, with the result that, if desired, a suitable cement or solder may be flowed into the joint adjacent to the point of contact between the ring 4 and the pot 1. The screw threaded connection may be soldered after the parts are assembled. If desired the part 4 might be shrunk on or otherwise secured to the vertical side walls of the body 3 instead of, or supplemental to the use of screw threads; but it should be understood that the use of screw threads is preferable.

It will be seen that the member 3 acts as a stopper for the perforated bottom portion of the pot 1, while the member 4 acts in conjunction with said stopper as a clamping means therefor. By causing the stopper to project downwardly through the bottom of the pot 1, the bottom 3 is permitted to lie against, or in close proximity to the heating appliance.

What I claim is—

1. In a device of the character described, a pot or body portion having an opening in its bottom, a stopper therefor supported within the pot and projecting downwardly through the opening therein, the space within the walls of said stopper constituting a heating chamber, an external stopper retaining member engaging that part of the stopper projecting through said body portion.

2. In a device of the character described, a pot having a perforated bottom, a stopper therefor comprising a centrally depressed flanged member, the flange thereof being supported on the bottom of the pot around the perforation therein, the centrally depressed portion projecting through said perforation and below said bottom, a retaining member secured to the external wall of said depressed portion and clamping the edge of the pot around said opening or perforation between it and the flange on said stopper, the chamber or space within the centrally depressed portion of the stopper forming a heating chamber.

3. In a device of the character described, a pot, a centrally perforated bottom, a stopper therefor supported upon the bottom of said pot and around said opening, that part of said stopper within the area of said opening being depressed and a retaining device rigidly secured to the external wall of the centrally depressed portion of the stopper and externally of the pot.

4. In a device of the character described, a pot having a perforation in its bottom, a stopper for said perforation comprising a member having a centrally depressed portion adapted to the perforation, and a flanged portion arranged to rest upon the edge of the pot around said perforation, a stopper retainer secured to said stopper externally of the pot, and an enamel like lining for the interior of the pot, said lining extending to the edge of the stopper flange.

Signed at Meriden Connecticut this 15 day of February 1907.

GEORGE E. SAVAGE.

Witnesses:
E. J. POOLEY,
A. L. STETSON